C. F. WITTEN.
STALK CUTTER.
APPLICATION FILED APR. 2, 1910.
976,329.
Patented Nov. 22, 1910.
3 SHEETS—SHEET 1.
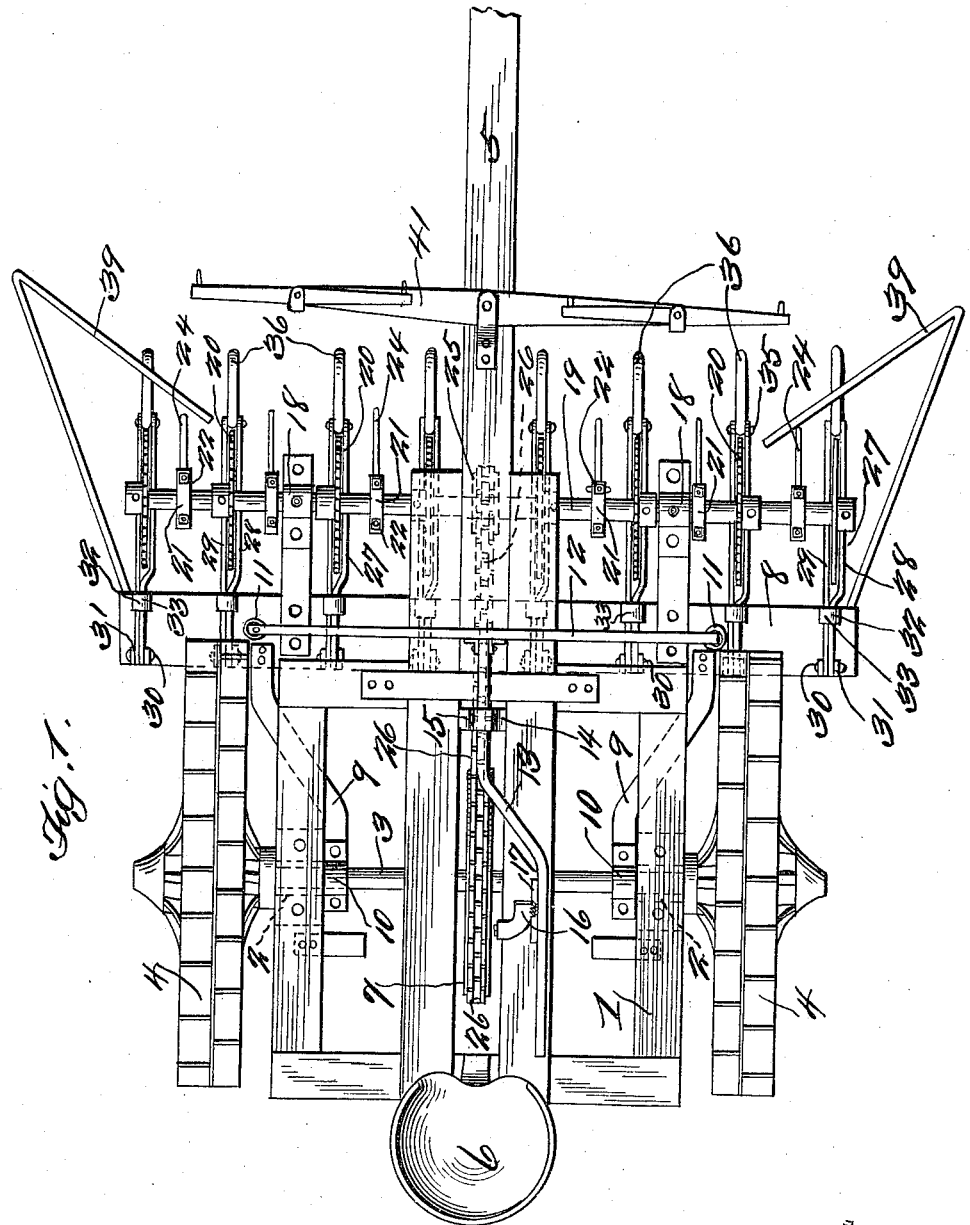

C. F. WITTEN.
STALK CUTTER.
APPLICATION FILED APR. 2, 1910.
976,329.
Patented Nov. 22, 1910.
3 SHEETS—SHEET 2.
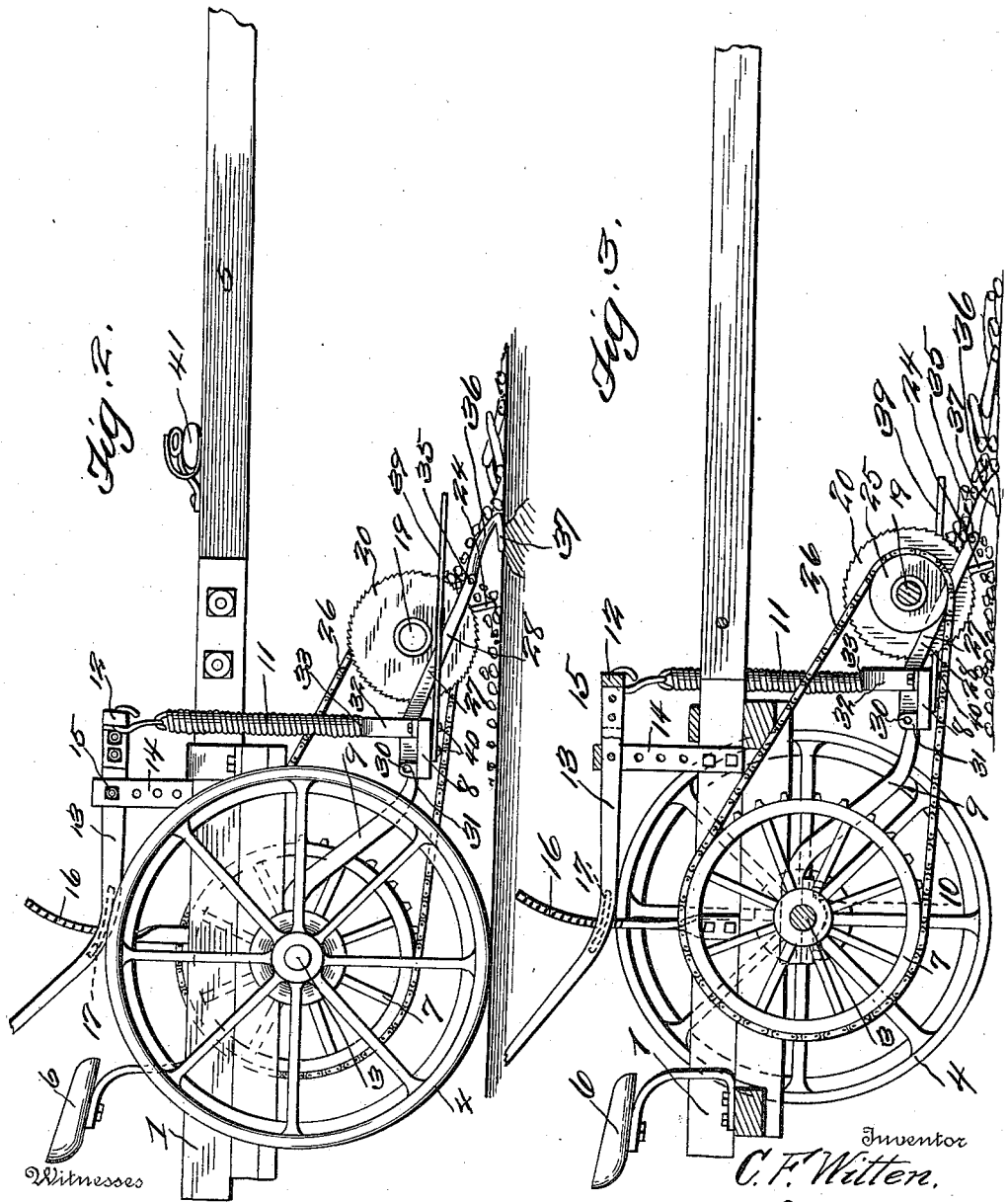

C. F. WITTEN.
STALK CUTTER.
APPLICATION FILED APR. 2, 1910.
976,329.
Patented Nov. 22, 1910.
3 SHEETS—SHEET 3.
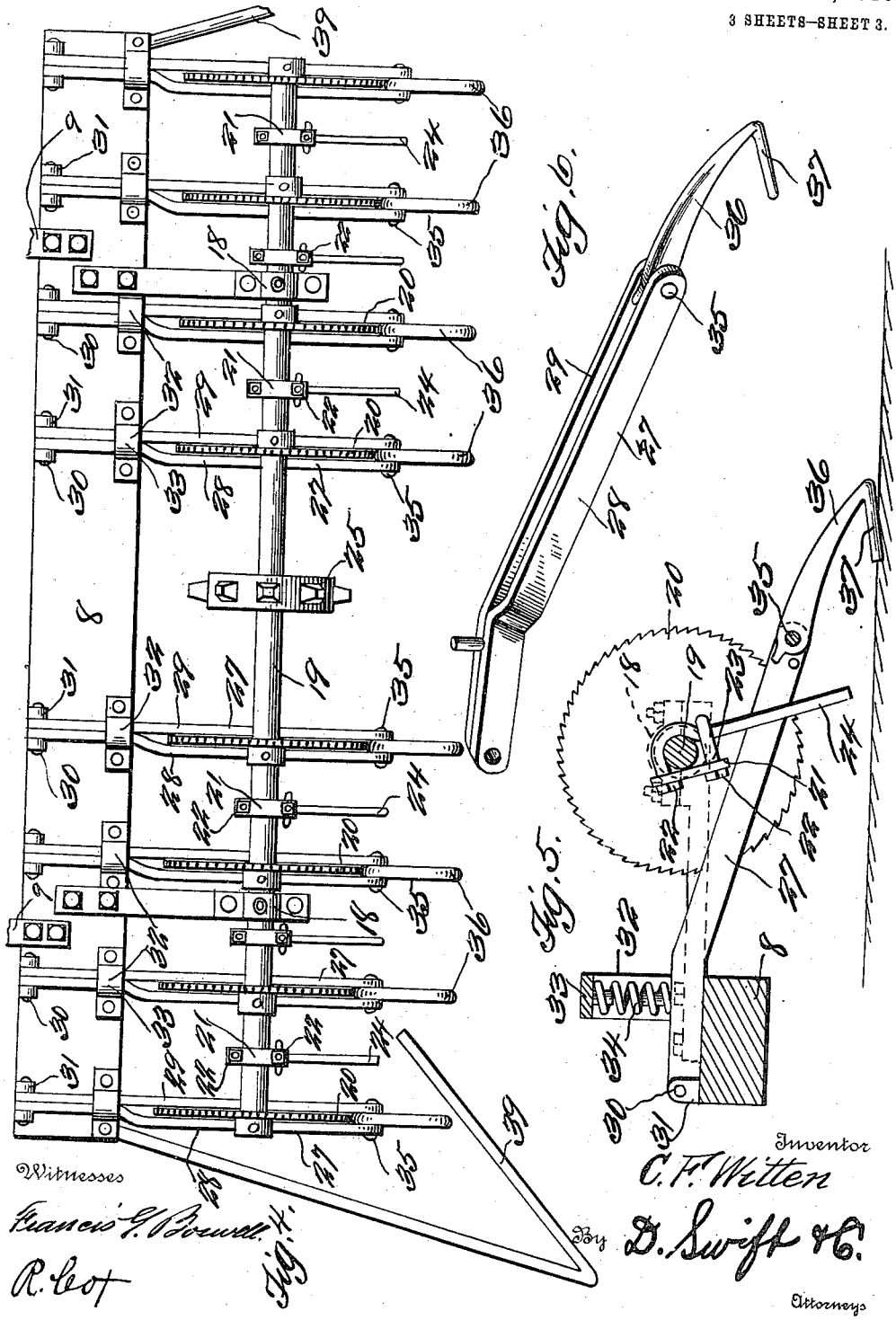

UNITED STATES PATENT OFFICE.

CHARLES F. WITTEN, OF NORMAN, OKLAHOMA.

STALK-CUTTER.

976,329.  Specification of Letters Patent.  Patented Nov. 22, 1910.

Application filed April 2, 1910. Serial No. 553,138.

*To all whom it may concern:*

Be it known that I, CHARLES F. WITTEN, a citizen of the United States, residing at Norman, in the county of Cleveland and State of Oklahoma, have invented a new and useful Stalk-Cutter; and I do hereby declare the following to be a full, clear, and exact description of the invention, such as will enable others skilled in the art to which it appertains to make and use the same.

This invention belongs to the art of farming implements, and it particularly pertains to a new and useful cutter, whereby corn and cotton stalks, or stalks of any other produce, may be severed.

The primary object of the invention, is the provision of a series of rotary disk saws, mounted in such wise as to yield vertically, in order to accommodate themselves to the unevenness of the soil.

Another feature of the invention is the production of a series of forks (which are provided with pivotally mounted fork-tips having bent-under extremities) so arranged and formed as to receive portions of the rotary disk saws, so that when the stalks are gathered, they may be fed directly to the saws and severed. The disk saws and the forks are carried by a vertically oscillating frame (which is supplemental to the main frame of the apparatus). This supplemental frame may be raised and lowered by a suitable lever, and is mounted to yield with regard to the lever, so that the saws, and the forks, as one body may accommodate themselves to the irregularities of the soil.

Another important feature of the invention is to mount each individual fork upon the supplemental frame, in order to readily yield, in case stones or clods fall in the path of any one of the forks.

The rotary disk saws are carried by and fixed to a revolving shaft (which is mounted in bearings on the supplemental frame) which receives power from the drive shaft of the main frame.

Another essential feature of the invention is the readily projecting arms or fingers of the revolving shaft, which fingers or arms are arranged between the disk saws, so as to throw the severed stalks in the rear of the saws.

Carried by the supplemental frame are triangular shaped members designed for the purpose of guiding standing and partly fallen stalks to the saws.

In the drawings, a certain form of apparatus is disclosed, but in experimenting and reducing to practice this form of apparatus, if the applicant finds it necessary to alter various parts thereof, for instance, the details of the structure, he is entitled to do so, provided the alterations fall within the scope of the appended claims.

Further features and combinations of parts will be hereinafter more fully set forth and pointed out in the appended claims.

In the drawings:—Figure 1 is a plan view of the cutter, embodying the features of the invention. Fig. 2 is a side elevation of the same. Fig. 3 is a central sectional view longitudinally of Fig. 1. Fig. 4 is an enlarged plan view of the supplemental frame, and the series of disk saws and teeth carried thereby. Fig. 5 is an enlarged detail sectional view, showing the detailed structure of the teeth and the mounting of the same and further illustrating the disk saws. Fig. 6 is an enlarged perspective view of one of the teeth.

Relative to the annexed illustrations, 1 represents the main frame of the apparatus, in bearings 2 of which the drive shaft 3 is journaled. Mounted to rotate with the drive shaft are the traction wheels 4. This main frame is provided with the usual tongue 5 and seat 6. Also mounted upon the drive shaft to rotate therewith, is a sprocket wheel 7.

8 denotes a supplemental frame, which is provided with rearwardly converging bars 9, which are loosely mounted or pivoted upon the main drive shaft, as shown at 10. Connected to the supplemental frame, adjacent each end thereof are tensioned coil springs 11, the upper extremities of which are connected to the horizontal portion 12 of the T-shaped lever 13. This T-shaped lever is pivotally mounted upon a standard 14, as shown at 15. To hold the lever in various adjusted positions, is a segmental tooth rack 16, with the teeth of which, a lateral projection 17 engages. It will be noted, however, that the supplemental frame is always yieldably supported, regardless of the position that it may assume, by the manipulation of the T-shaped lever.

Journaled in bearings 18 of the supplemental frame is a rotating shaft 19, with which the disk saws 20 are designed to revolve. Projecting radially from the rotating shaft, and fixed thereto, by means of plates 21, nuts 22 and eye bolts or pins 23, are arms or fingers 24, the purpose of which being to throw the stalks (which are previously severed) to the rear of the saws, as the shaft rotates.

Fixed to rotate with the rotating shaft is a sprocket 25, about which and the sprocket 7, the chain 26 travels, in order that power may be transmitted to the rotating shaft 19.

27 designates a series of forks, which consist of two parts 28 and 29, one located on each side of the disk saw. These two parts are brought together in the rear of the saws, and are pivoted upon the pins 30, of the brackets 31, which are bolted to the supplemental frame. Secured to the supplemental frame and arching over the forks are the arched brackets or guides 32, between the horizontal portions 33 of which and the forks, coil springs 34 are disposed, in order to hold the forks adjacent the beam of the supplemental frame. These springs 34 are designed to allow the forks to yield individually, in case they strike projections, stones, or clods of the soil.

Arranged between the parts 28 and 29 of the forks, and pivoted upon pins 35 are the fork-tips 36, the extremities of which are bent under, as shown at 37, in order that they may easily and readily glide over the soil. The points at which the fork-tips are bent are sufficiently sharp, so that the stalks may be properly gathered. Because of the pivotal connection between the fork-tips and the parts 28 and 29 of the fork proper, the fork-tips may readily cater individually to the small hills and gullies and clods of the soil, regardless of the yielding action of the forks proper. In other words, when the fork-tips rise when passing over a clod, they fall back in place by gravity.

In order to guide upstanding or partly fallen stalks to the teeth and saws, either end of the supplemental frame may be provided with triangular shaped guide members or frames 39, which are bolted to the supplemental frame, as shown at 40.

The tongue of the main frame is provided with the usual form of draft equalizer 41, whereby the apparatus may be drawn forward.

As the apparatus or cutter is drawn through a field, the stalks are picked up by the forks, and deflected toward the disk saws, where they are easily and quickly severed, after which they are thrown rearwardly of the saws, by means of the radially projecting fingers or arms of the revolving shaft. An operator sitting upon the seat of the main frame is in a position suitable to manage his horses, and when it is so desired, he can at the same time manipulate the T-shaped lever, whereby the supplemental frame is raised or lowered. As the supplemental frame is raised, the fork-tips fall by gravity, in positions upon the soil, whether in gullies or upon small hills or clods. The fork tips 36 are provided with lugs 36$^a$, which are designed to contact with the pins 36$^b$, in order to limit the upward movement of the fork tips.

The invention having been set forth, what is claimed as new and useful is:—

1. In a stalk cutter, a supplemental frame yieldably supported, a shaft journaled in bearings thereon and provided with disk saws, forks pivoted to the supplemental frame, brackets therefor, yielding means in said brackets for coöperating with the forks, said forks having gravitating fork tips, and means to limit the upward movement of the gravitating fork tips.

2. In a stalk cutter, a supplemental frame yieldably supported, a shaft journaled in bearings thereon and provided with disk saws, forks pivoted to the supplemental frame, brackets therefor, yielding means in said brackets for coöperating with the forks, said forks having gravitating fork tips, means to limit the upward movement of the gravitating fork tips, said shaft having fingers or arms adjustably carried thereby and located between the saws.

3. In a stalk cutter, a series of yieldable forwardly projecting members, gravitating tips pivotally mounted on said members, and means to limit the upward movement of said tips, said tips being bent at an angle.

4. A supplemental frame having a series of individual forks, a saw mounted in each of said forks, and a gravitating tip carried by each of said forks.

5. In a stalk cutter, a series of forwardly projecting members pivoted at their rear ends, a spring arranged in front of each of said pivots and adapted to force said members downwardly, said members being provided with saws.

6. In a stalk cutter, a series of forwardly projecting members pivoted at their rear ends, a spring disposed in the front of each of said pivots for pressing said members downwardly, severing means arranged in relative position to said members, and gravitating tips carried by said members.

7. In a stalk cutter, a supplemental frame having severing means, said frame having individual yieldable forks each provided with an individual yieldable fork-tip.

8. In a stalk cutter, a supplemental frame having severing means, said frame having individual yieldable forks each provided with an individual gravitating fork-tip.

9. In a stalk cutter, a yieldably supported, supplemental frame having severing means, said frame having individual yieldable forks each provided with an individual gravitating fork-tip.

10. In a stalk cutter, a supplemental yieldably supported frame having severing means, said frame having individual yieldable forks provided with side arms to straddle the severing means, said forks being each provided with an individual gravitating fork-tip.

11. In a stalk cutter, a supplemental yieldably supported frame having a series of forks each provided with an individual gravitating fork-tip.

12. In a stalk cutter, a supplemental frame having a series of individual yieldable forks each provided with an individual gravitating fork-tip.

In testimony whereof I have signed my name to this specification in the presence of two subscribing witnesses.

CHARLES F. WITTEN.

Witnesses:
J. O. BLACK,
H. M. McCOMB.